United States Patent
Chen (10) Patent No.: US 9,941,073 B2
(45) Date of Patent: Apr. 10, 2018

(54) KEYBOARD DEVICE

(71) Applicant: PRIMAX ELECTRONICS LTD., Taipei (TW)

(72) Inventor: Bo-An Chen, Taipei (TW)

(73) Assignee: Primax Electronics Ltd., Taipei (TW)

(*) Notice: Subject to any disclaimer, the term of this patent is extended or adjusted under 35 U.S.C. 154(b) by 28 days.

(21) Appl. No.: 15/338,028

(22) Filed: Oct. 28, 2016

(65) Prior Publication Data

US 2018/0025862 A1    Jan. 25, 2018

(30) Foreign Application Priority Data

Jul. 22, 2016   (TW) ............................ 105123290 A (51) Int. Cl.

| | | |
|---|---|---|
| *H01H 13/705* | (2006.01) | |
| *G06F 1/16* | (2006.01) | |
| *H01H 13/704* | (2006.01) | |
| *H01H 13/703* | (2006.01) | |
| *H01H 3/12* | (2006.01) | |

(52) U.S. Cl.
CPC ............. *H01H 13/705* (2013.01); *G06F 1/16* (2013.01); *H01H 13/703* (2013.01); *H01H 13/704* (2013.01); *H01H 3/125* (2013.01)

(58) Field of Classification Search
CPC ...... H01H 3/125; H01H 13/83; H01H 13/705; H01H 13/14; H01H 13/70
USPC .............. 200/5 A, 314, 344, 341, 312, 512; 400/490, 491, 491.2, 495.1, 496
See application file for complete search history.

(56) References Cited

U.S. PATENT DOCUMENTS

| | | | |
|---|---|---|---|
| 9,697,965 B2* | 7/2017 | Chen .................... | H01H 13/705 |
| 2013/0220786 A1* | 8/2013 | Niu ........................ | H01H 3/125 200/344 |
| 2015/0101916 A1* | 4/2015 | Chen ..................... | H01H 3/125 200/5 A |

* cited by examiner

*Primary Examiner* — Ahmed Saeed
(74) *Attorney, Agent, or Firm* — Kirton McConkie; Evan R. Witt (57) ABSTRACT

A keyboard device includes a base plate, a key and a membrane circuit board. The key is connected with the base plate. The membrane circuit board is arranged between the key and the base plate. The base plate includes a connecting structure. The connecting structure is protruded upwardly and penetrated through the membrane circuit board. The key includes a keycap and a stabilizer bar. The stabilizer bar is pivotally coupled to the keycap. A hook part of the stabilizer bar is penetrated through a corresponding locking hole of the connecting structure. The membrane circuit board includes an extension part. The extension part is extended from a first side of the locking hole to a second side of the locking hole and penetrated through the locking hole. Consequently, the hook part of the stabilizer bar is movable on the extension part of the membrane circuit board.

11 Claims, 9 Drawing Sheets

FIG.11

KEYBOARD DEVICE

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices.

Figure 1:
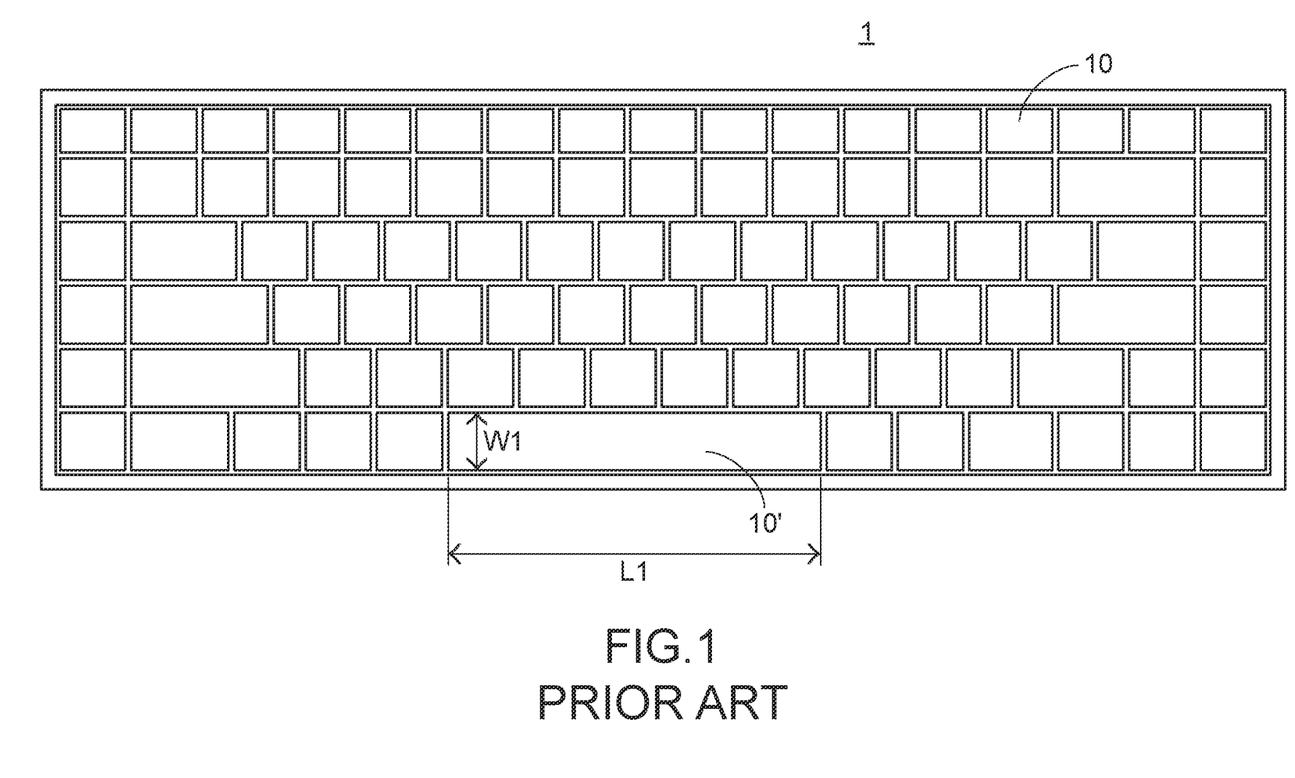
FIG. 1 is a schematic top view illustrating the outer appearance of a conventional keyboard device.
Figure 2:
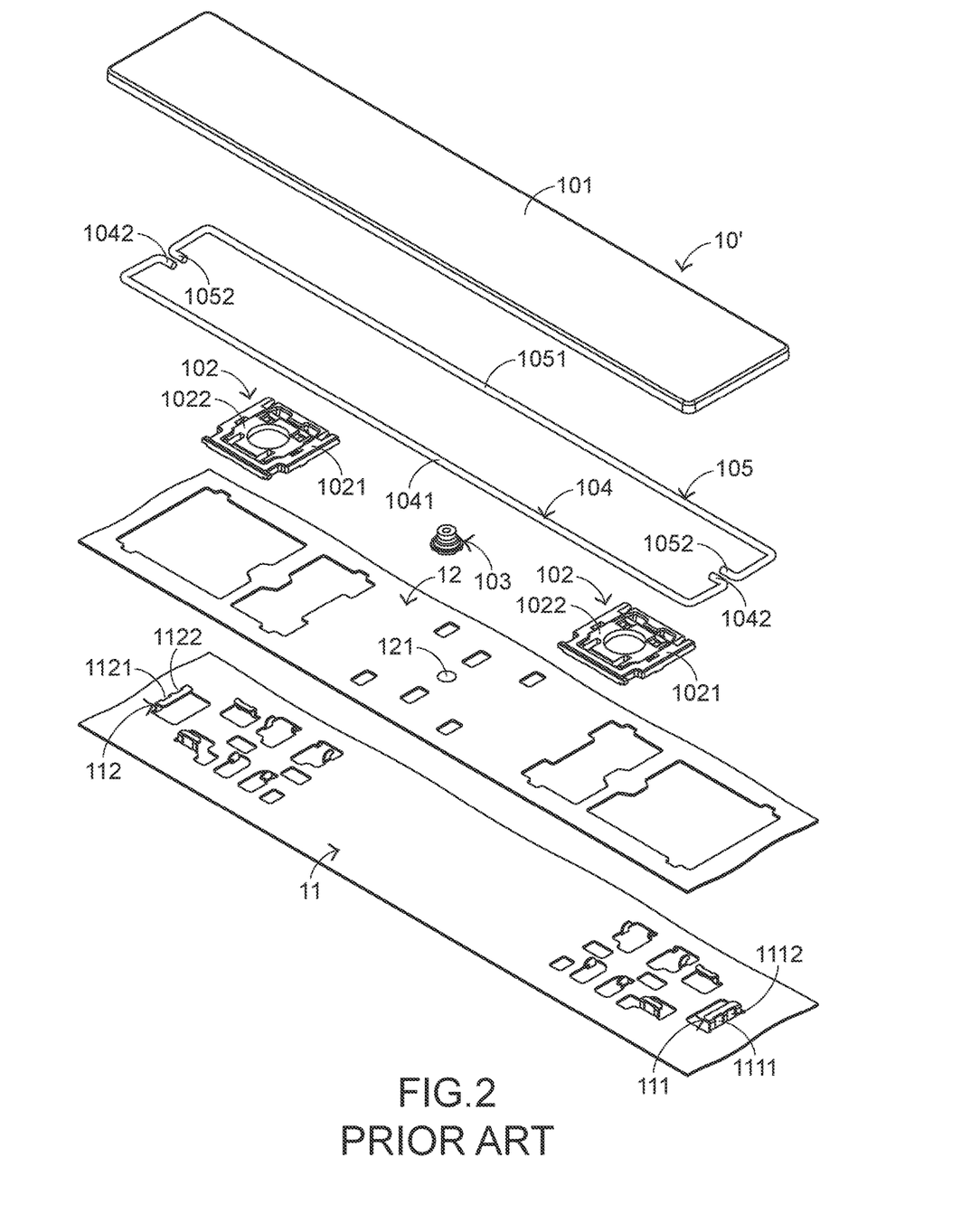
FIG. 2 is a schematic exploded view illustrating a portion of the keyboard device of FIG. 1 and taken along a viewpoint.
Figure 3:
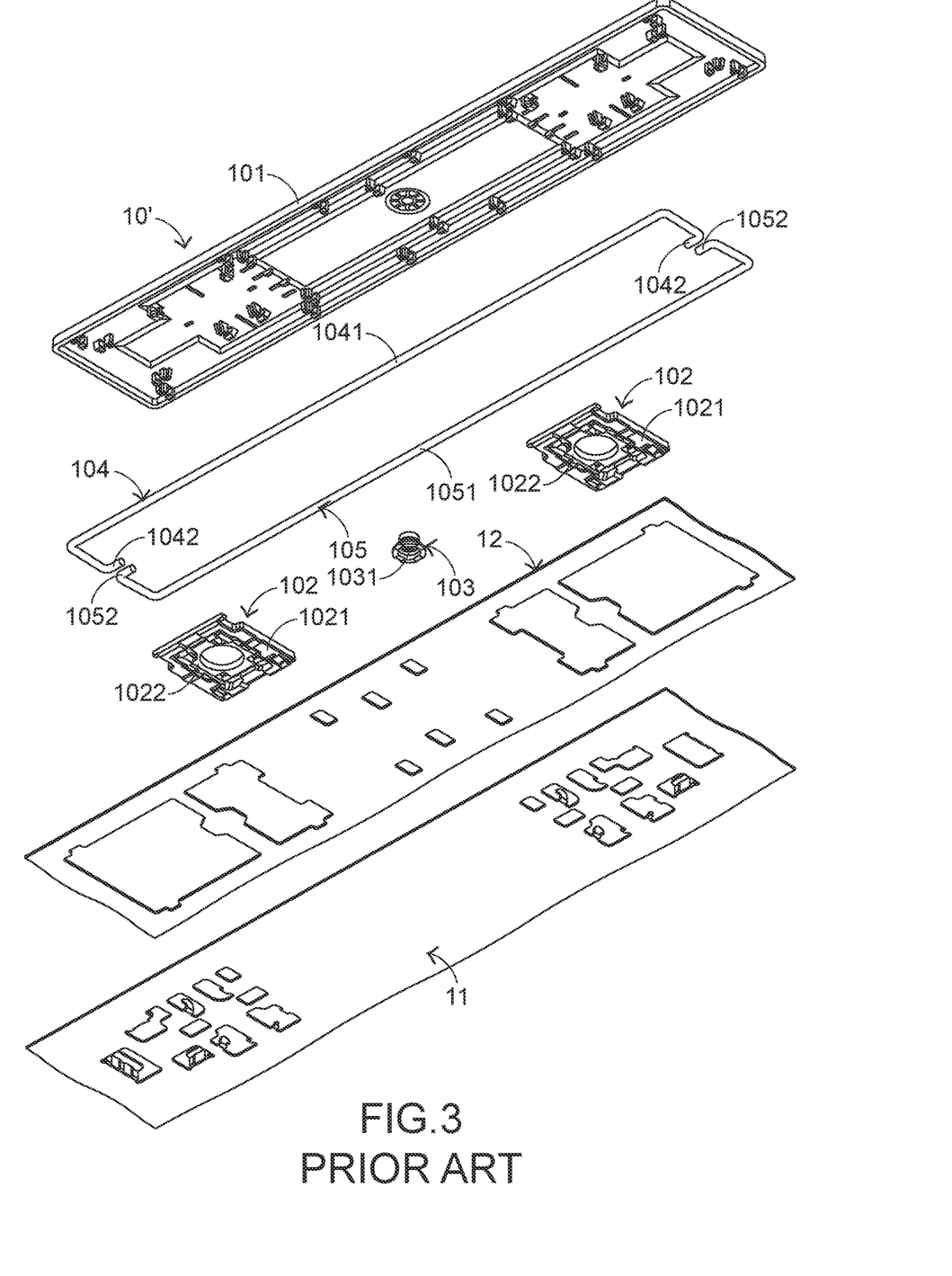
FIG. 3 is a schematic exploded view illustrating a portion of the keyboard device of FIG. 1 and taken along another viewpoint.

The structures and the functions of a conventional keyboard device 1 will be illustrated as follows. Please refer to FIGS. 1, 2 and 3. FIG. 1 is a schematic top view illustrating the outer appearance of a conventional keyboard device. FIG. 2 is a schematic exploded view illustrating a portion of the keyboard device of FIG. 1 and taken along a viewpoint. FIG. 3 is a schematic exploded view illustrating a portion of the keyboard device of FIG. 1 and taken along another viewpoint. For succinctness, only one key 10' and related components are shown in FIGS. 2 and 3.

The conventional keyboard device 1 comprises plural keys 10 and 10', a base plate 11 and a membrane circuit board 12. The membrane circuit board 12 comprises plural membrane switches 121 corresponding to the plural keys 10 and 10'. Each of the plural keys 10 and 10' comprises a keycap 101, at least one scissors-type connecting element 102 and an elastic element 103. The scissors-type connecting element 102 is connected between the keycap 101 and the base plate 11. Moreover, the scissors-type connecting element 102 comprises a first frame 1021 and a second frame 1022. The second frame 1022 is pivotally coupled to the first frame 1021. Consequently, the first frame 1021 and the second frame 1022 can be swung relative to each other. The elastic element 103 is arranged between the keycap 101 and the base plate 11. Moreover, the elastic element 103 comprises a contacting part 1031.

While the keycap 101 of any key 10 or 10' is depressed and moved downwardly relative to the base plate 11, the first frame 1021 and the second frame 1022 of the scissors-type connecting element 102 are switched from an open-scissors state to a stacked state. Moreover, as the keycap 101 is moved downwardly to compress the elastic element 103, the corresponding membrane switch 121 is pushed and triggered by the contacting part 1031 of the elastic element 103. Consequently, the keyboard device 1 generates a corresponding key signal. When the keycap 101 of the key 10 or 10' is no longer depressed, the keycap 101 is moved upwardly relative to the base plate 11 in response to an elastic force of the elastic element 103. Meanwhile, the first frame 1021 and the second frame 1022 are switched from the stacked state to the open-scissors state again, and the keycap 101 is returned to its original position.

As shown in the drawings, the length L1 of the key 10' is much larger than the width W1 of the key 10'. The key 10' further comprises a first stabilizer bar 104 and a second stabilizer bar 105. The first stabilizer bar 104 comprises a first transverse bar part 1041 and two first hook parts 1042. The two first hook parts 1042 are located at two ends of the first stabilizer bar 104, respectively. The second stabilizer bar 105 comprises a second transverse bar part 1051 and two second hook parts 1052. The two second hook parts 1052 are located at two ends of the second stabilizer bar 105, respectively.

The base plate 11 comprises a first connecting structure 111 and a second connecting structure 112. The first connecting structure 111 and the second connecting structure 112 are protruded upwardly, and penetrated through the membrane circuit board 12. The first connecting structure 111 comprises a first locking hole 1111 and a third locking hole 1112. The second connecting structure 112 comprises a second locking hole 1121 and a fourth locking hole 1122. The second locking hole 1121 corresponds to the first locking hole 1111, and the fourth locking hole 1122 corresponds to the third locking hole 1112.

The first transverse bar part 1041 of the first stabilizer bar 104 and the second transverse bar part 1051 of the second stabilizer bar 105 are pivotally coupled to the keycap 101 of the key 10'. The two first hook parts 1042 of the first stabilizer bar 104 are penetrated through the first locking hole 1111 of the first connecting structure 111 and the second locking hole 1121 of the second connecting structure 112, respectively. The two second hook parts 1052 of the second stabilizer bar 105 are penetrated through the third locking hole 1112 of the first connecting structure 111 and the fourth locking hole 1122 of the second connecting structure 112, respectively.

Figure 4:
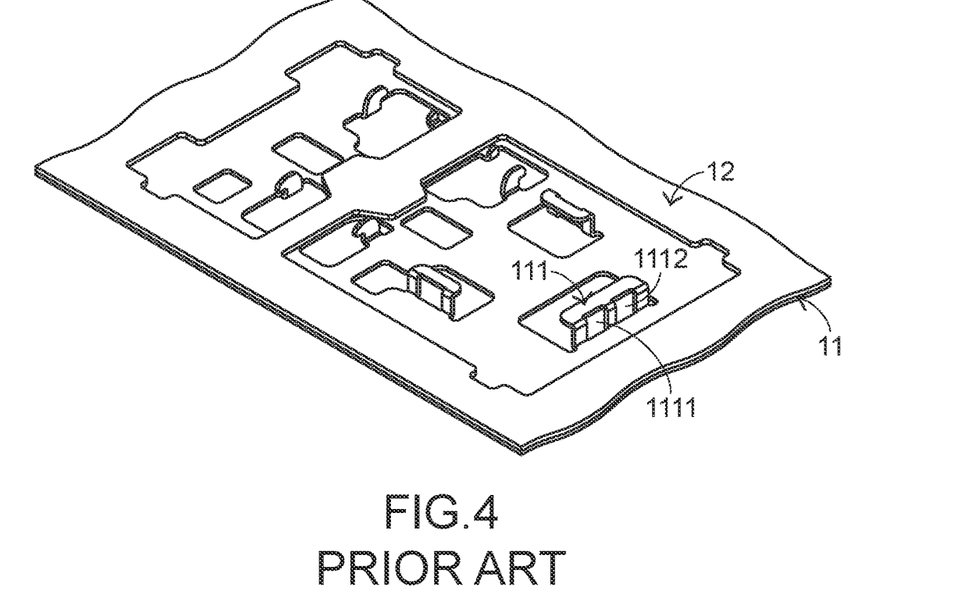
FIG. 4 is a schematic perspective view illustrating a portion of the combination of the base plate and the membrane circuit board of the keyboard device as shown in FIG. 1.
Figure 5:
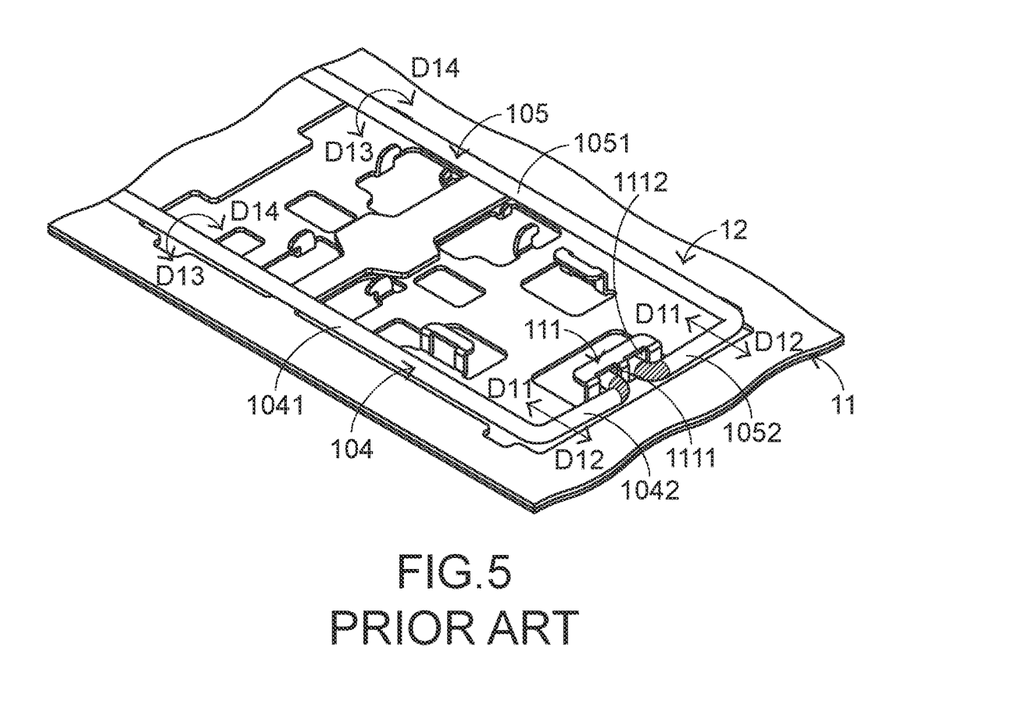
FIG. 5 schematically illustrates the actions of the first stabilizer bar and the second stabilizer bar of the keyboard device as shown in FIG. 1.

FIG. 4 is a schematic perspective view illustrating a portion of the combination of the base plate and the membrane circuit board of the keyboard device as shown in FIG. 1. FIG. 5 schematically illustrates the actions of the first stabilizer bar and the second stabilizer bar of the keyboard device as shown in FIG. 1. While the keycap 101 of the key 10' is moved upwardly or downwardly relative to the base plate 11, the first stabilizer bar 104 is moved in the direction D11 or the direction D12 and rotated in the direction D13 or the direction D14. Similarly, the second stabilizer bar 105 is moved in the direction D11 or the direction D12 and rotated in the direction D13 or the direction D14. By this design, the key 10' is kept stable and not inclined while the key 10' is moved upwardly or downwardly relative to the base plate 11. Moreover, this design is helpful to increase the strength of the keycap 101.

However, the conventional keyboard device 1 still has some drawbacks. For example, all of the first stabilizer bar 104, the second stabilizer bar 105 and the base plate 11 are made of metallic material. Please refer to FIGS. 4 and 5. While the keycap 101 of the key 10' is moved upwardly or downwardly relative to the base plate 11 and the first stabilizer bar 104 and the second stabilizer bar 105 are correspondingly moved and rotated, the two first hook parts 1042 of the first stabilizer bar 104 and the two second hook parts 1052 of the second stabilizer bar 105 are readily contacted with the metallic base plate 11. While the two first hook parts 1042 and the two second hook parts 1052 collide with the metallic base plate 11, a click sound is generated. Especially when the R corners of the two first hook parts 1042 and the two second hook parts 1052 (e.g., the regions indicated by oblique lines of FIG. 5) collide with the metallic base plate 11, the click sound is generated. This sound is unpleasant noise to the user.

In other words, the conventional keyboard device needs to be further improved.

SUMMARY OF THE INVENTION

An object of the present invention provides a keyboard device having a function of preventing the activated stabilizer bar of the key from contacting and colliding with a base plate. Consequently, the generated noise is reduced, and the operating comfort to the user is enhanced.

In accordance with an aspect of the present invention, there is provided a keyboard device. The keyboard device includes a key, a base plate and a membrane circuit board. The key includes a keycap and a stabilizer bar. The stabilizer bar includes a transverse bar part and a first hook part. The transverse bar part is pivotally coupled to the keycap. The first hook part is located at a first end of the transverse bar part. The base plate is connected with the key, and includes a first connecting structure. The first connecting structure is protruded upwardly from the base plate and includes a first locking hole. The first hook part of the stabilizer bar is penetrated through the first locking hole. The membrane circuit board is arranged between the key and the base plate, and includes a membrane switch corresponding to the key. The membrane circuit board further includes a first extension part. The first extension part is extended from a first side of the first locking hole to a second side of the first locking hole and penetrated through the first locking hole. While the keycap is moved upwardly or downwardly relative to the base plate, the first hook part penetrated through the first locking hole is movable on the first extension part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 6:
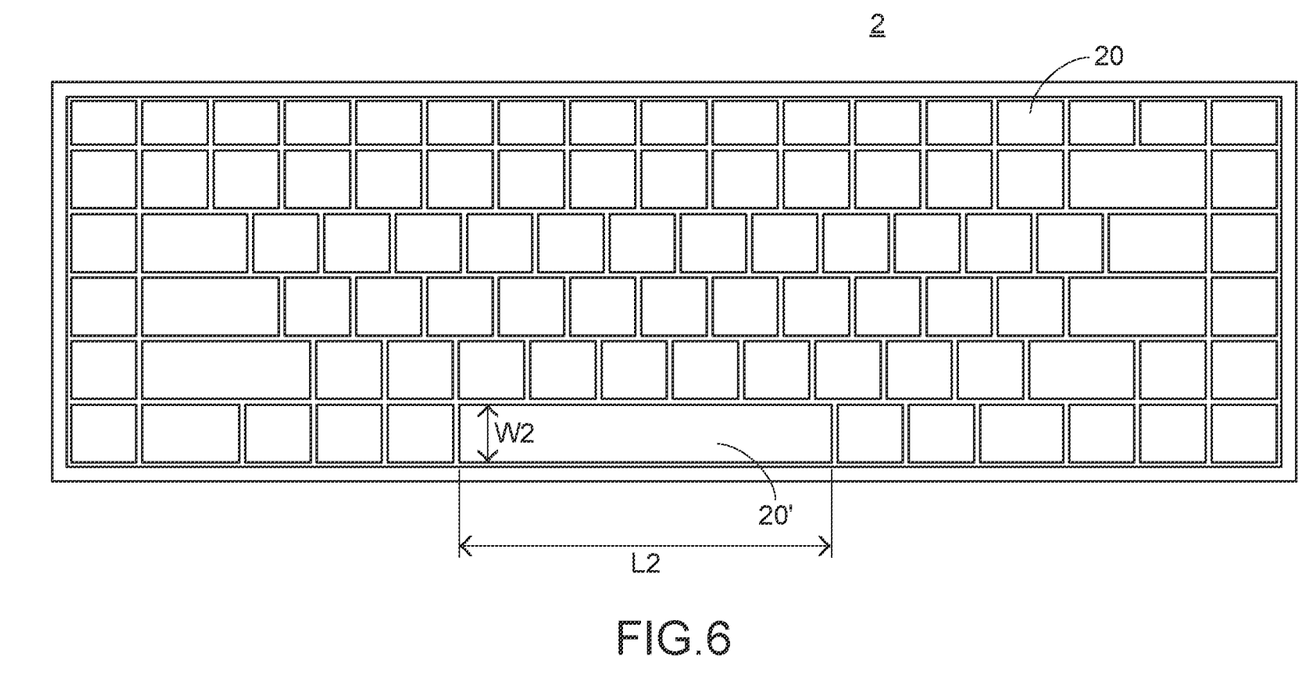
FIG. 6 is a schematic top view illustrating the outer appearance of a keyboard device according to an embodiment of the present invention.
Figure 7:
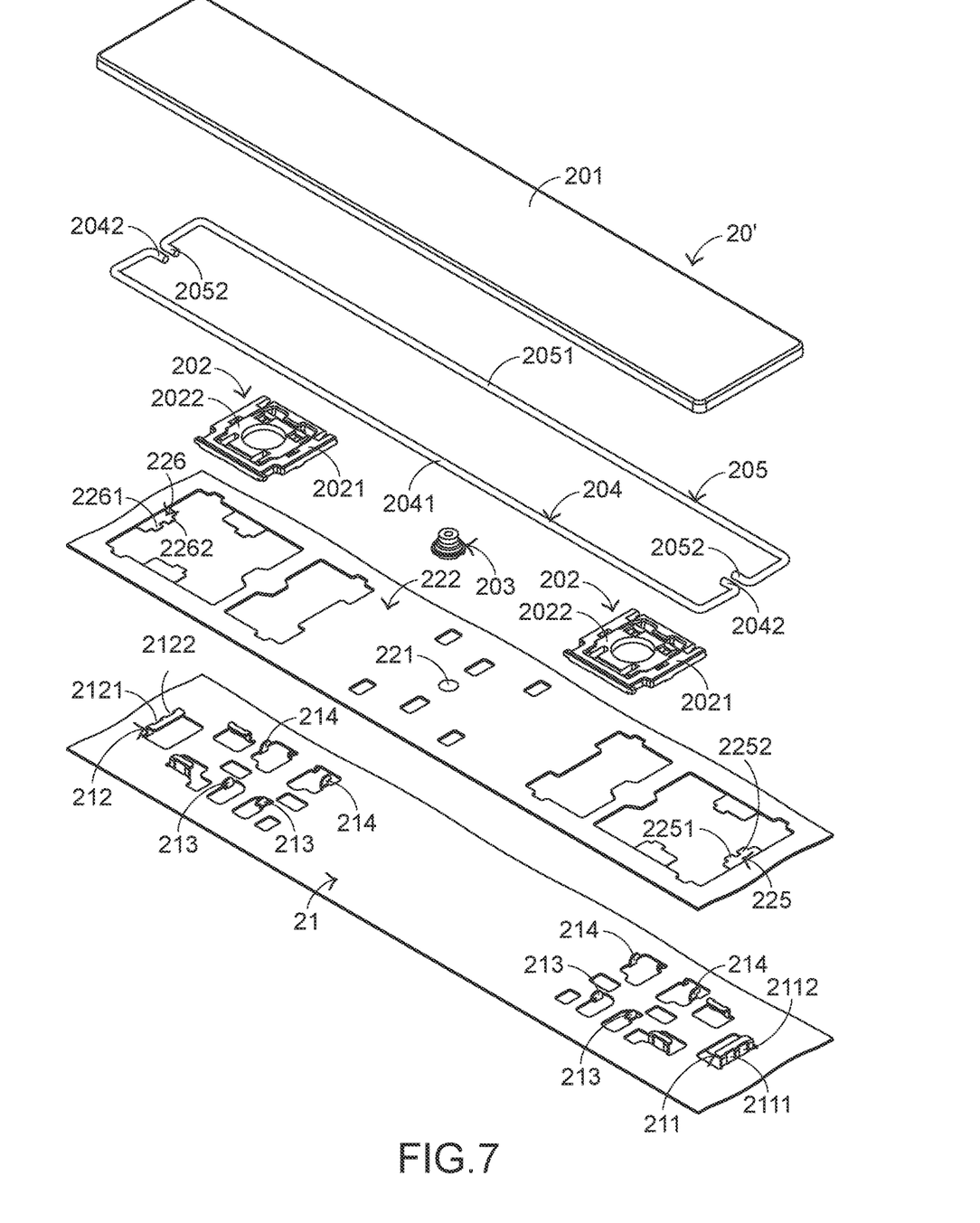
FIG. 7 is a schematic exploded view illustrating a portion of the keyboard device of FIG. 6 and taken along a viewpoint.
Figure 8:
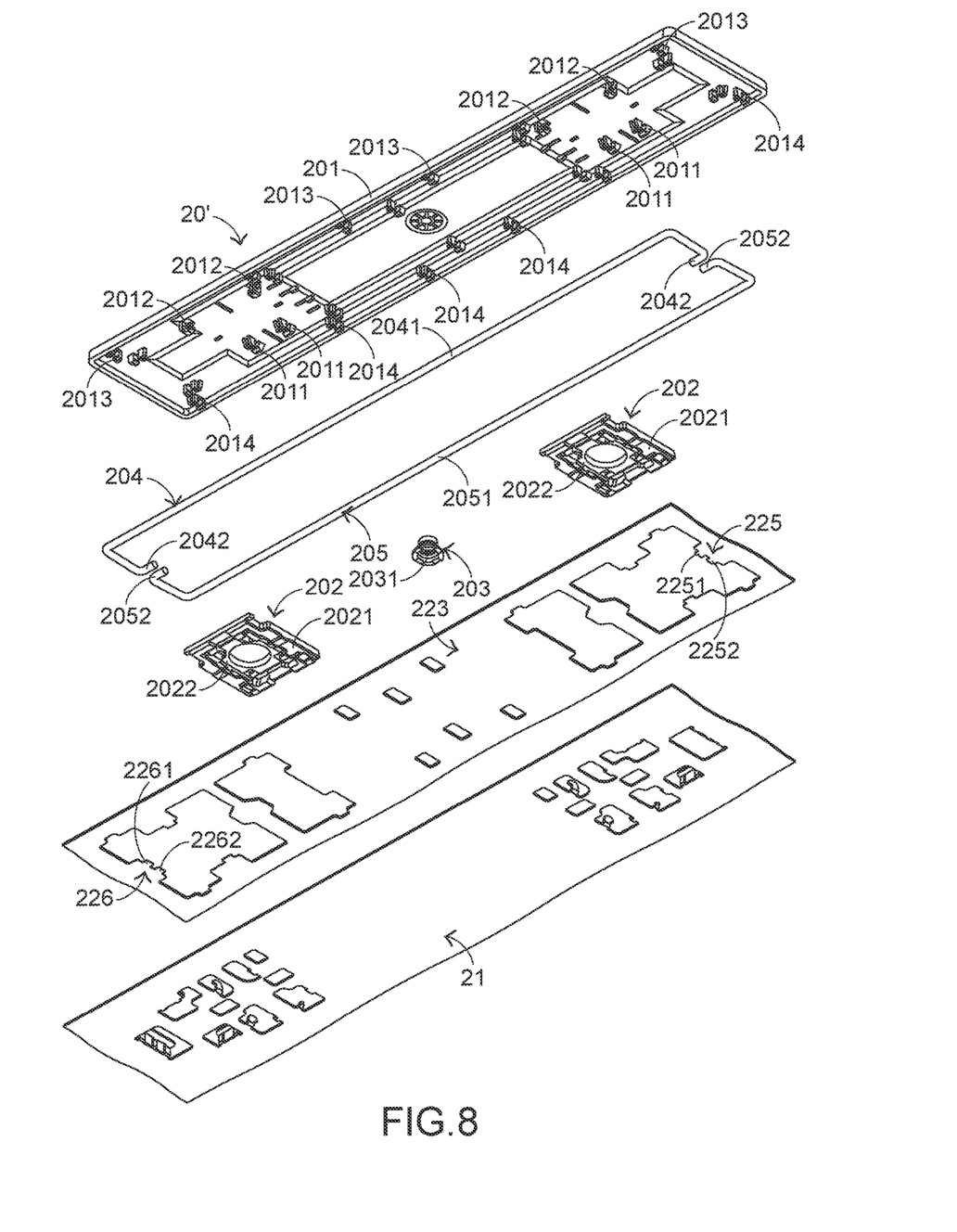
FIG. 8 is a schematic exploded view illustrating a portion of the keyboard device of FIG. 6 and taken along another viewpoint.

Please refer to FIGS. 6, 7 and 8. FIG. 6 is a schematic top view illustrating the outer appearance of a keyboard device according to an embodiment of the present invention. FIG. 7 is a schematic exploded view illustrating a portion of the keyboard device of FIG. 6 and taken along a viewpoint. FIG. 8 is a schematic exploded view illustrating a portion of the keyboard device of FIG. 6 and taken along another viewpoint. For succinctness, only one key 20' and related components are shown in FIGS. 7 and 8.

The keyboard device 2 comprises plural keys 20 and 20', a base plate 21 and a membrane circuit board 22. The membrane circuit board 22 is arranged between the plural keys 20, 20' and the base plate 21. These keys 20 and 20' are classified into some types, e.g., ordinary keys, numeric keys and function keys. When one of the keys 20 and 20' is depressed by the user's finger, a corresponding key signal is generated to the computer, and thus the computer executes a function corresponding to the depressed key. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

Figure 9:
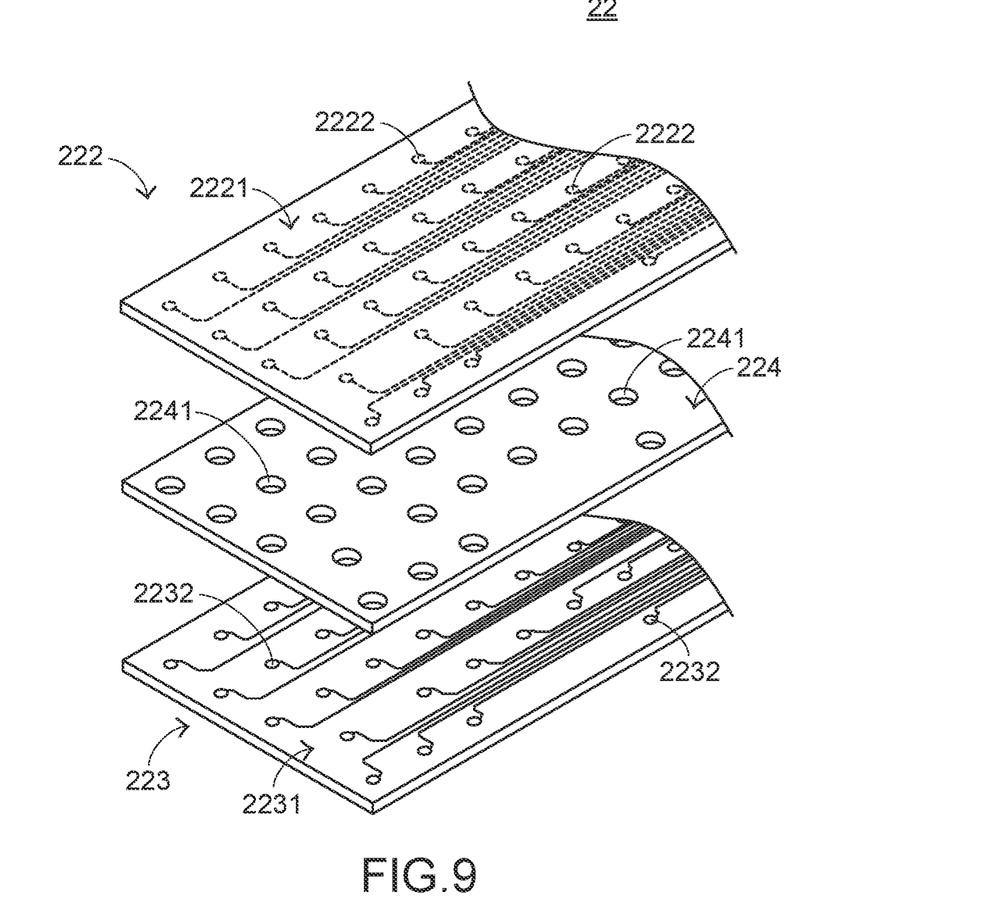
FIG. 9 is a schematic exploded view illustrating the membrane circuit board of the keyboard device as shown in FIG. 6.

FIG. 9 is a schematic exploded view illustrating the membrane circuit board of the keyboard device as shown in FIG. 6. The membrane circuit board 22 comprises plural film layers, which are arranged in a stack form. In this embodiment, the membrane circuit board 22 comprises an upper film layer 222 and a lower film layer 223. A first circuit pattern 2221 is formed on a bottom surface of the upper film layer 222. The first circuit pattern 2221 comprises plural upper contacts 2222 corresponding to the plural keys 20 and 20'. A second circuit pattern 2231 is formed on a top surface of the lower film layer 223. The second circuit pattern 2231 comprises plural lower contacts 2232 corresponding to the plural upper contacts 2222. Each of the upper contacts 2222 and the corresponding lower contact 2232 are separated from each other by a spacing interval. Moreover, each of the upper contacts 2222 and the corresponding lower contact 2232 are collectively defined as a membrane switch 221. Moreover, for maintaining the spacing interval between each upper contact 2222 and the corresponding lower contact 2232, the membrane circuit board 22 further comprises an intermediate film layer 224. The intermediate film layer 224 is arranged between the upper film layer 222 and the lower film layer 223. In addition, the intermediate film layer 224 comprises plural perforations 2241 corresponding to the plural upper contacts 2222 and the plural lower contacts 2232. Preferably but not exclusively, at least one of the upper film layer 222, the lower film layer 223 and the intermediate film layer 224 is made of polycarbonate (PC), polyethylene terephthalate (PET), polymethylmethacrylate (PMMA), polyurethane (PU) or polyimide (PI).

Each of the plural keys 20 and 20' comprises a keycap 201, at least one connecting element 202 and an elastic element 203. The connecting element 202 is connected between the keycap 201 and the base plate 21. Through the connecting element 202, the keycap 201 is moved upwardly or downwardly relative to the base plate 21. The elastic element 203 is arranged between the keycap 201 and the base plate 21. Moreover, the elastic element 203 comprises a contacting part 2031. In this embodiment, the connecting element 202 is a scissors-type connecting element. Moreover, the connecting element 202 comprises a first frame 2021 and a second frame 2022. The second frame 2022 is pivotally coupled to the first frame 2021. Consequently, the first frame 2021 and the second frame 2022 can be swung relative to each other.

Each keycap 201 comprises a connecting lock part 2011 and a connecting hook part 2012. The base plate 21 comprises a first hook 213 and a second hook 214. The first hook 213 and the second hook 214 are protruded upwardly and penetrated through the membrane circuit board 22. A first end of the first frame 2021 is connected with the connecting lock part 2011 of the keycap 201. A second end of the first frame 2021 is connected with the second hook 214 of the base plate 21. A first end of the second frame 2022 is connected with the connecting hook part 2012 of the keycap 201. A second end of the second frame 2022 is connected with the first hook 213 of the base plate 21. The connecting relationships between the connecting element 202, the base plate 21 and the keycap 201 are presented herein for purpose of illustration and description only.

While the keycap 201 of any key 20 or 20' is depressed and moved downwardly relative to the base plate 21, the first frame 2021 and the second frame 2022 of the connecting element 202 are switched from an open-scissors state to a stacked state. Moreover, as the keycap 201 is moved downwardly to compress the elastic element 203, the corresponding upper contact 2222 is pushed and triggered by the contacting part 2031 of the elastic element 203. Consequently, the corresponding upper contact 2222 is contacted with the corresponding lower contact 2232 through the corresponding perforation 2241. In such way, the corresponding membrane switch 221 is electrically conducted, and the keyboard device 2 generates a corresponding key signal. When the keycap 201 of the key 20 or 20' is no longer depressed, the keycap 201 is moved upwardly relative to the base plate 21 in response to an elastic force of the elastic element 203. Meanwhile, the first frame 2021 and the second frame 2022 are switched from the stacked state to the open-scissors state again, and the keycap 201 is returned to its original position.

As shown in FIGS. 6, 7 and 8, the length L2 of the key 20' is much larger than the width W2 of the key 20'. The key 20' further comprises a first stabilizer bar 204 and a second stabilizer bar 205. The first stabilizer bar 204 comprises a first transverse bar part 2041 and two first hook parts 2042. The two first hook parts 2042 are located at two ends of the first stabilizer bar 204, respectively. The second stabilizer bar 205 comprises a second transverse bar part 2051 and two second hook parts 2052. The two second hook parts 2052 are located at two ends of the second stabilizer bar 205, respectively.

As mentioned above, the length L2 of the key 20' is much larger than the width W2 of the key 20'. The keycap 201 of the key 20' further comprises plural first stabilizer lock parts 2013 and plural second stabilizer lock parts 2014. The first transverse bar part 2041 is penetrated through the plural first stabilizer lock parts 2013 and pivotally coupled to the plural first stabilizer lock parts 2013. The second transverse bar part 2051 is penetrated through the plural second stabilizer lock parts 2014 and pivotally coupled with the plural second stabilizer lock parts 2014.

The base plate 21 comprises a first connecting structure 211 and a second connecting structure 212. The first connecting structure 211 and the second connecting structure 212 are protruded upwardly, and penetrated through the membrane circuit board 22. The first connecting structure 211 comprises a first locking hole 2111 and a third locking hole 2112. The second connecting structure 212 comprises a second locking hole 2121 and a fourth locking hole 2122. The second locking hole 2121 corresponds to the first locking hole 2111, and the fourth locking hole 2122 corresponds to the third locking hole 2112. The two first hook parts 2042 of the first stabilizer bar 204 are penetrated through the first locking hole 2111 of the first connecting structure 211 and the second locking hole 2121 of the second connecting structure 212, respectively. The two second hook parts 2052 of the second stabilizer bar 205 are penetrated through the third locking hole 2112 of the first connecting structure 211 and the fourth locking hole 2122 of the second connecting structure 212, respectively.

Figure 10:
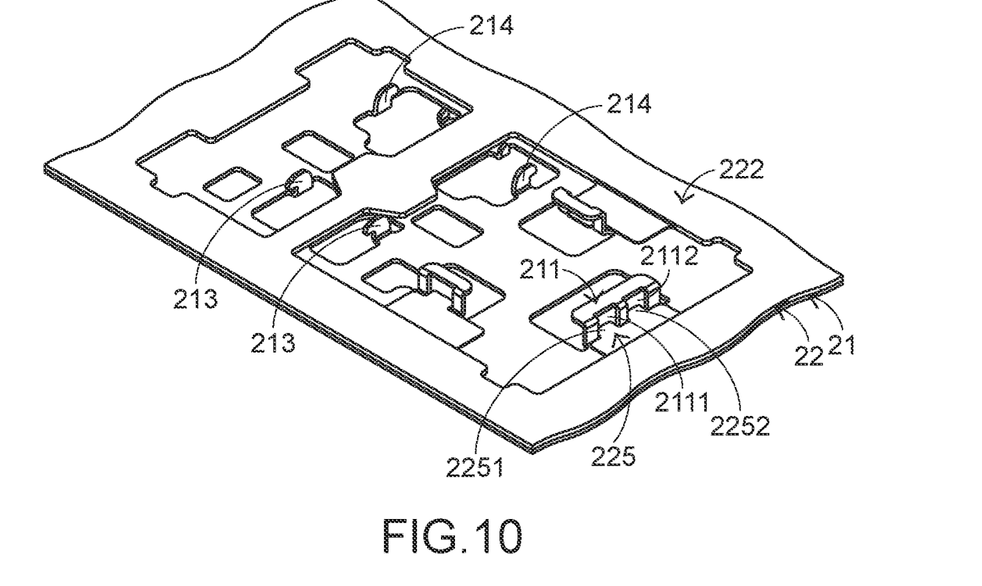
FIG. 10 is a schematic perspective view illustrating a portion of the combination of the base plate and the membrane circuit board of the keyboard device as shown in FIG. 6.

FIG. 10 is a schematic perspective view illustrating a portion of the combination of the base plate and the membrane circuit board of the keyboard device as shown in FIG. 6. The membrane circuit board 22 of the keyboard device 2 further comprises a first extension part 225 and a second extension part 226. The first extension part 225 is extended from the lower film layer 223 and toward the first connecting structure 211. The second extension part 226 is extended from the lower film layer 223 and toward the second connecting structure 212. The first extension part 225 comprises a first bulge 2251 and a third bulge 2252. The first bulge 2251 is extended from a first side of the first locking hole 2111 to a second side of the first locking hole 2111 and penetrated through the first locking hole 2111. The third bulge 2252 is extended from a first side of the third locking hole 2112 to a second side of the third locking hole 2112 and penetrated through the third locking hole 2112. The second extension part 226 comprises a second bulge 2261 and a fourth bulge 2262 (see FIG. 8). The second bulge 2261 is extended from a first side of the second locking hole 2121 to a second side of the second locking hole 2121 and penetrated through the second locking hole 2121. The fourth bulge 2262 is extended from a first side of the fourth locking hole 2122 to a second side of the fourth locking hole 2122 and penetrated through the fourth locking hole 2122. In this embodiment, the first extension part 225 and the second extension part 226 are extended from the lower film layer 223 and respectively extended toward the first connecting structure 211 and the second connecting structure 212. It is noted that numerous modifications and alterations may be made while retaining the teachings of the invention. For example, in another embodiment, the first extension part 225 and the second extension part 226 are extended from the intermediate film layer 224 or the upper film layer 222. Moreover, the first extension part 225 and the second extension part 226 are respectively extended toward the first connecting structure 211 and the second connecting structure 212.

Figure 11:
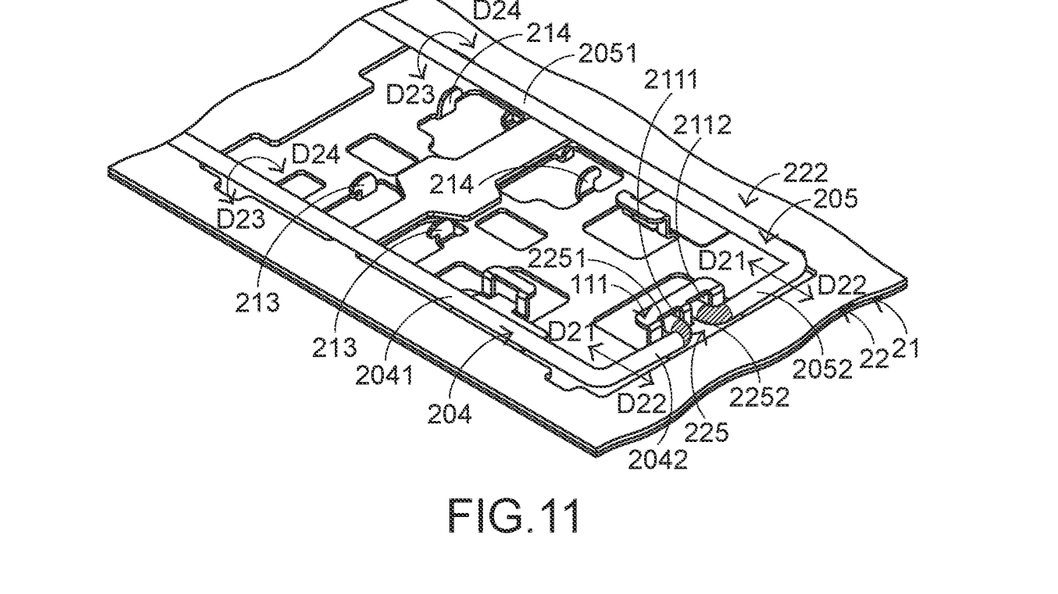
FIG. 11 schematically illustrates the actions of the first stabilizer bar and the second stabilizer bar of the keyboard device as shown in FIG. 6.

FIG. 11 schematically illustrates the actions of the first stabilizer bar and the second stabilizer bar of the keyboard device as shown in FIG. 6. While the keycap 201 of the key 20' is moved upwardly or downwardly relative to the base plate 21, the first stabilizer bar 204 is moved in the direction D21 or the direction D22 and rotated in the direction D23 or the direction D24, and the first transverse bar part 2041 of the first stabilizer bar 204 is rotated relative to the plural first stabilizer lock parts 2013. Similarly, the second stabilizer bar 205 is moved in the direction D21 or the direction D22 and rotated in the direction D23 or the direction D24, and the second transverse bar part 2051 of the second stabilizer bar 205 is rotated relative to the plural second stabilizer lock parts 2014. By this design, the key 20' is kept stable and not inclined while the key 20' is moved upwardly or downwardly relative to the base plate 21. Moreover, this design is helpful to increase the strength of the keycap 201.

Please refer to FIGS. 10 and 11 again. The membrane circuit board 22 of the keyboard device 2 further comprises the first extension part 225 and the second extension part 226. The two first hook parts 2042 of the first stabilizer bar 204 are separated from the base plate 21 by the first extension part 225. The two second hook parts 2052 of the second stabilizer bar 205 are separated from the base plate 21 by the second extension part 226. Even if all of the first stabilizer bar 204, the second stabilizer bar 205 and the base plate 21 are made of the metallic material, the drawbacks of the conventional technology will not be generated. For example, while the keycap 201 of the key 20' is moved upwardly or downwardly relative to the base plate 21 and the first stabilizer bar 204 and the second stabilizer bar 205 are correspondingly moved and rotated, the two first hook parts 2042 of the first stabilizer bar 204 and the two second hook parts 2052 of the second stabilizer bar 205 are respectively moved on the first extension part 225 and the second extension part 226. Since the two first hook parts 2042 and the two second hook parts 2052 are not directly contacted with the base plate 21, the two first hook parts 2042 and the two second hook parts 2052 do not collide with the base plate 21 to generate the unpleasant noise.

More especially, the first bulge 2251 and the third bulge 2252 of the first extension part 225 are respectively penetrated through the first locking hole 2111 and the third locking hole 2112, and the second bulge 2261 and the fourth bulge 2262 of the second extension part 226 are respectively penetrated through the second locking hole 2121 and the fourth locking hole 2122. Consequently, the R corners of the two first hook parts 2042 of the first stabilizer bar 204 (e.g., the regions indicated by oblique lines of FIG. 11) and the two second hook parts 2052 of the second stabilizer bar 205 (e.g., the regions indicated by oblique lines of FIG. 11) will not collide with the base plate 21. Under this circumstance, the unpleasant noise is not generated.

From the above descriptions, the present invention provides the keyboard device 2. The structural strength and the action stability of the keycap 201 are both taken into consideration. During operations of the stabilizer bars 204 and 205 of the key 20', the possibility of contacting the stabilizer bars 204 and 205 with the base plate 21 is minimized. Consequently, the unpleasant noise is reduced, and the operating comfort to the user is enhanced. In other words, the keyboard device of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
   a key comprising a keycap and a stabilizer bar, wherein the stabilizer bar comprises a transverse bar part and a first hook part, wherein the transverse bar part is pivotally coupled to the keycap, and the first hook part is located at a first end of the transverse bar part;
   a base plate connected with the key, and comprising a first connecting structure, wherein the first connecting structure is protruded upwardly from the base plate and comprises a first locking hole and a third locking hole, and the first hook part of the stabilizer bar is penetrated through the first locking hole; and
   a membrane circuit board arranged between the key and the base plate, and comprising a membrane switch corresponding to the key, wherein the membrane circuit board further comprises a first extension part, and wherein the first extension part comprises a first bulge and a third bulge, wherein the first bulge is extended from a first side of the first locking hole to a second side of the first locking hole and penetrated through the first locking hole, and wherein the third bulge is extended from a first side of the third locking hole to a second side of the third locking hole and penetrated through the third locking hole,
   wherein while the keycap is moved upwardly or downwardly relative to the base plate, the first hook part penetrated through the first locking hole is movable on the first extension part.

2. The keyboard device according to claim 1, wherein the membrane circuit board comprises plural film layers in a stack form, and the first extension part is extended from one of the plural film layers in a direction toward the first locking hole and penetrated through the first locking hole.

3. The keyboard device according to claim 2, wherein the plural film layers comprise an upper film layer and a lower film layer, wherein a first circuit pattern is formed on the upper film layer, and a second circuit pattern is formed on the lower film layer, wherein the first circuit pattern comprises an upper contact, and the second circuit pattern comprises a lower contact, wherein the upper contact and the lower contact are separated from each by a spacing interval and collectively defined as the membrane switch.

4. The keyboard device according to claim 2, wherein at least one of the plural film layers is made of polycarbonate (PC), polyethylene terephthalate (PET), polymethylmethacrylate (PMMA), polyurethane (PU) or polyimide (PI).

5. The keyboard device according to claim 1, wherein the base plate further comprises a second connecting structure, and the second connecting structure is protruded upwardly from the base plate and comprises a second locking hole and a fourth locking hole, wherein the stabilizer bar further comprises a second hook part, and the second hook part is located at a second end of the transverse bar part, wherein the membrane circuit board further comprises a second extension part, and wherein the second extension part comprises a second bulge and a fourth bulge, wherein the second bulge is extended from a first side of the second locking hole to a second side of the second locking hole and penetrated through the second locking hole, and wherein the fourth bulge is extended from a first side of the fourth locking hole to a second side of the fourth locking hole and penetrated through the fourth locking hole, wherein while the keycap is moved upwardly or downwardly relative to the base plate, the second hook part penetrated through the second locking hole is movable on the second extension part.

6. The keyboard device according to claim 1, wherein the keycap further comprises a stabilizer lock part, and the transverse bar part is penetrated through the stabilizer lock part and pivotally coupled to the stabilizer lock part, wherein while the keycap is moved upwardly or downwardly relative to the base plate, the transverse bar part is rotated relative to the stabilizer lock part.

7. The keyboard device according to claim 1, wherein the key further comprises a connecting element, and the connecting element is connected between the base plate and the keycap, wherein the keycap is movable upwardly or downwardly relative to the base plate through the connecting element.

8. The keyboard device according to claim 7, wherein the connecting element is a scissors-type connecting element comprising a first frame and a second frame, and the second frame is pivotally coupled to the first frame.

9. The keyboard device according to claim 8, wherein the keycap comprises a connecting lock part and a connecting hook part, wherein the connecting lock part is connected with an end of the first frame, and the connecting hook part is connected with an end of the second frame.

10. The keyboard device according to claim 8, wherein the base plate further comprises a first hook and a second hook, and the first hook and the second hook are protruded upwardly, wherein the first hook is connected with an end of the second frame, and the second hook is connected with an end of the first frame.

11. The keyboard device according to claim 1, wherein the key further comprises an elastic element, and the elastic element is arranged between the keycap and the membrane circuit board and comprises a contacting part, wherein while the keycap is depressed, the elastic element is compressed and the membrane switch is pushed by the contacting part, wherein when the keycap is not depressed, the keycap is returned to an original position in response to an elastic force provided by the elastic element.

* * * * *